United States Patent
Huang et al.

(10) Patent No.: US 10,975,275 B2
(45) Date of Patent: Apr. 13, 2021

(54) ELASTOMER ADHESIVE WITH RAPID TACK DEVELOPMENT

(71) Applicant: LORD Corporation, Cary, NC (US)

(72) Inventors: Jian-Ping Huang, Cary, NC (US); Lauren Lownes, Raleigh, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/342,712

(22) Filed: Nov. 3, 2016

(65) Prior Publication Data

US 2017/0121575 A1 May 4, 2017

Related U.S. Application Data

(60) Provisional application No. 62/250,124, filed on Nov. 3, 2015.

(51) Int. Cl.

| C09J 133/12 | (2006.01) |
|---|---|
| C09J 4/00 | (2006.01) |
| C08G 18/79 | (2006.01) |
| C08F 220/06 | (2006.01) |
| C08F 220/18 | (2006.01) |
| C08G 18/67 | (2006.01) |
| C09J 175/04 | (2006.01) |
| C09J 133/06 | (2006.01) |
| C09J 175/14 | (2006.01) |
| B29C 65/48 | (2006.01) |
| C09J 5/00 | (2006.01) |
| B29K 621/00 | (2006.01) |

(52) U.S. Cl.
CPC ........... *C09J 133/12* (2013.01); *B29C 65/485* (2013.01); *C08F 220/06* (2013.01); *C08F 220/18* (2013.01); *C08G 18/6785* (2013.01); *C08G 18/792* (2013.01); *C09J 4/00* (2013.01); *C09J 5/00* (2013.01); *C09J 133/066* (2013.01); *C09J 175/04* (2013.01); *C09J 175/14* (2013.01); *B29K 2621/00* (2013.01); *C09J 2433/00* (2013.01)

(58) Field of Classification Search
CPC .... C09J 133/12; C09J 133/066; C09J 175/04; C09J 175/14; B29C 65/485
See application file for complete search history.

(56) References Cited

U.S. PATENT DOCUMENTS

| 4,052,244 A | 10/1977 | Skoultchi |
|---|---|---|
| 4,128,600 A | 12/1978 | Skinner et al. |
| 4,223,115 A | 9/1980 | Zalucha et al. |
| 4,452,944 A | 6/1984 | Dawdy |
| 4,769,419 A | 9/1988 | Dawdy |
| 5,212,211 A | 5/1993 | Welch, II et al. |
| 5,641,834 A | 6/1997 | Abbey et al. |
| 5,710,235 A | 1/1998 | Abbey et al. |
| 6,641,911 B1 | 11/2003 | Puerkner et al. |
| 7,189,781 B2 | 3/2007 | Acevedo et al. |
| 7,419,564 B2 | 9/2008 | Henke et al. |
| 7,560,519 B2 | 7/2009 | Canelas et al. |
| 7,713,955 B2 | 5/2010 | Whiteford et al. |
| 2003/0078316 A1 | 4/2003 | Bradford et al. |
| 2003/0207956 A1 | 11/2003 | Balch et al. |
| 2005/0267276 A1 | 12/2005 | Chu |
| 2006/0052523 A1* | 3/2006 | Bushendorf ............... B32B 7/12 524/589 |
| 2007/0029034 A1 | 2/2007 | Mgaya et al. |
| 2012/0279654 A1* | 11/2012 | Jialanella ........... C08G 18/2081 156/331.1 |
| 2012/0296038 A1 | 11/2012 | Rourke |
| 2012/0329897 A1 | 12/2012 | True et al. |
| 2014/0163130 A1 | 6/2014 | Zhang et al. |
| 2014/0242322 A1 | 8/2014 | Giorgini |
| 2015/0159062 A1 | 6/2015 | Giorgini |
| 2015/0376576 A1 | 12/2015 | Rahim et al. |

FOREIGN PATENT DOCUMENTS

| CN | 103834328 A | 6/2014 | |
|---|---|---|---|
| CN | 104650779 A | 5/2015 | |
| CN | 108350127 A | 7/2018 | |
| EP | 0330115 | 8/1989 | |
| JP | 2000313869 A * | 11/2000 | |
| JP | 2014101443 | 6/2014 | |
| JP | 2014101443 A * | 6/2014 | |
| JP | 2015098560 | 5/2015 | |
| JP | 2015098560 A * | 5/2015 | |
| WO | WO-2013016136 A2 * | 1/2013 | ............ C08G 18/24 |
| WO | WO 2017/079426 A1 | 5/2017 | |

OTHER PUBLICATIONS

JP-2015098560_English Translation.*
JP-2014101443_English Translation.*
JP-2000313869_Nov. 2000_English.*
International Search Report and Written Opinion for Application No. PCT/US2016/060312 dated Feb. 8, 2017.
European Office Action for Application No. 16816454.9 dated Jul. 4, 2019.
Chinese Office Action for Application No. 201680064288.6 dated Oct. 8, 2019.
International Preliminary Report on Patentability and Written Opinion for Application No. PCT/US2016/060312 dated May 8, 2018.
Chinese Office Action for Application No. 201680064288.6 dated Jun. 28, 2020.

\* cited by examiner

*Primary Examiner* — Michael L Leonard
(74) *Attorney, Agent, or Firm* — Jenkins, Wilson, Taylor & Hunt, P.A.

(57) ABSTRACT

An adhesive composition having two distinct reaction mechanisms, a first being the reaction between a tri-functional isocyanate and an active hydrogen compound and a second begin the free radical initiation of an acrylic monomer. This adhesive develops tack strength through the first reaction allowing two substrates to remain in position relative to one another while the free radical cure of the acrylic monomer takes place to fully bond the substrates together, for example when adhering a rubber liner to the inside of a metallic tank.

17 Claims, No Drawings

ELASTOMER ADHESIVE WITH RAPID TACK DEVELOPMENT

CROSS REFERENCE TO RELATED APPLICATIONS

The present application claims priority under 35 U.S.C. § 119(e) from U.S. Provisional Patent Application Ser. No. 62/250,124 filed Nov. 3, 2015, entitled "Elastomer Adhesive With Rapid Tack Development", the disclosure of which is incorporated herein by reference.

FIELD OF THE INVENTION

The invention relates to an adhesive suitable for bonding elastomers to metal and other substrates, particularly post-vulcanized elastomer to metals where the bonding application requires rapid tack development to hold the adhesive in place during the bonding operation.

BACKGROUND OF THE ART

In the prior art tank lining practice, uncured rubber is bonded to a steel tank inner portion using a solvent-based adhesive. The solvent based adhesive is applied on both the rubber and steel substrates. After the solvent evaporates, the adhesive layer has a tacky consistency. The two surfaces are then mated together. The tacky adhesive provides a holding power so that the rubber stays in place. The lined tank will then be heated to cure both rubber and adhesive at the same time. One heating method is to pressurize the tank with steam.

The solvents in the adhesive mixture are emitted to the atmosphere, polluting the environment, and potentially impacting workers' health. In addition, the process is complex, long, and energy-consuming.

Recent developments in 100% reactive acrylic-based adhesives have allowed their use in tank lining and repair applications. These adhesives are dispensed as a creamy paste that will harden gradually. These adhesives are effective in horizontal bonding applications, but may not be suited for vertical or inverted bonding as in the tank lining situation where >80% bonding is vertical or overhead. The adhesive needs to have immediate holding power so that the attached elastomer sheet will not slip before the adhesive can fully cure.

SUMMARY OF THE INVENTION

In a first embodiment of the present invention, an adhesive is provided that is capable of bonding a wide assortment of elastomers to various substrates. The adhesive provides a mechanism for rapid development of tack to secure an elastomer substrate in place during the bonding process.

The adhesive of an embodiment of the present invention comprises a zero-VOC, 100% reactive structural adhesive formulation that cures at or around ambient temperature, and delivers a quick tack for easy use in tank repair and lining applications. It has demonstrated robust performance under harsh environments.

An embodiment of the present invention provides an adhesive formulation that possesses a two-stage cure mechanism. First, a rapid isocyanate-driven crosslinking partially cures the adhesive to deliver the desired tack/holding power in under 10-15 minutes. This allows the adhesive to be mixed, coated on an elastomeric substrate, and adhered to a second substrate with the tacky adhesive holding the substrates in place. Then a conventional acrylic cure mechanism will initiate through a free-radical cure course to reach full cure with desired cure speeds. These two cure mechanism operate separately/independently to allow for precise tailoring of tack development and open time.

In a further embodiment of the present invention, the adhesive formulation provides a tri-functional isocyanate, which when reacted in the present of an active-hydrogen containing species, crosslinks to provide a three-dimensional polymer network. This three-dimensional network adds to the cohesive strength of the adhesive, particularly before the acrylate cure develops. This three-dimensional network is then permeated by the acrylate species, which once cured through the redox reaction, provides an intermolecular penetrating network (IPM) of polyacrylate polymer within the crosslinked isocyanate. Without a tri-functional isocyanate, the cured species would only provide a two-dimensional "chain" rather than the preferred three dimensional network of cure isocyanate.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

DETAILED DESCRIPTION

In a preferred embodiment of the present invention, an adhesive system is provided based on a two-part acrylic adhesive comprising an "A-side" and a "B-side" allowing the reactive components to remain separate until just prior to application. Two separate cure mechanisms are provided, the first comprising an acrylic monomer curable through a redox reaction, and a second comprising an isocyanate curable by reacting with an active hydrogen containing compound.

In another preferred embodiment of the present invention, the A-side comprises an acrylic monomer and an active hydrogen containing compound, and the B-side comprises a tri-functional isocyanate and an oxidizer.

In one embodiment of the present invention, the adhesive comprises a room-temperature curable acrylate-based adhesive useful for post-vulcanization elastomer bonding. This adhesive is descried more fully below.

In one embodiment of the present invention, the adhesive comprises a tri-functional isocyanate as an additional cure mechanism to provide initial tack for the adhesive. The tri-functional isocyanate, preferably included in the B-side, will quickly react with any active-hydrogen containing compounds like hydrophilic fumed silica, methacrylic acid, phosphoric acid, and HEMA-phosphate, typically included in the A-side to prevent gelling/curing prior to use.

While not wishing to be bound by the theory, it is believed that the tri-functional isocyanate provides for polymer chain growth through two of the reactive isocyanate groups, and cross-linking lightly in the resin matrix through the third isocyanate group providing an internal structure to the adhesive. This internal structure enhances tackiness by providing cohesive strength to the adhesive sufficient to retain the position of the elastomer substrate while the slower acrylic cure reaction develops. In related investigations employing diisocyanates, viscosity/chain length is developed upon cure, but the adhesive remains gummy or stringy without strong enough cohesion to support the rubber substrate. The areal weight of the rubber, the thickness multiplied by the density, will also affect the necessary tack strength of the adhesive.

In a preferred embodiment of the present invention, the tri-functional isocyanate comprises three isocyanate groups linked through a cyclic isocyanurate. As such, the trifunctional cyclic isocyanurate is a product of trimerization of diisocyanates, for example a trimer of hydrogenated methylenediphenyl isocyanate (H-MDI), a trimer of hexamethylene diisocyanate (HDI), a trimer of isophorone diisocyanate (IPDI), or a trimer of toluene diisocyanate (TDI). Further, asymmetric trimers of HDI or HDI/IPDI copolyisocyanates may be employed. In another embodiment of the present invention, the tri-functional isocyanate comprises a biuret linkage, such as an HDI (hexamethylene diisocyanate), or TDI (toluene diisocyanate)-based biuret.

In a preferred embodiment of the present invention, the tri-functional isocyanate comprises a trimer of hexamethylene diisocyanate, commercially available as Desmodur N3300A available from Convestro (formerly Bayer Material Science).

In an alternate embodiment of the present invention, a multifunctional polymeric isocyanate with an isocyanate functionality of greater than 2 is employed. For example, a poly-methylene diphenyl diisocyanate (MDI) with an average isocyanate functionality of 3 to 10.

In one embodiment of the present invention, the isocyanate is present in the as-applied adhesive in an amount from about 3.0 to about 5.0 weight percent based on the total weight of the adhesive. Additionally, the structure and average isocyanate functionality of the isocyanate will affect cure rate and cohesive strength. The relative amount of isocyanate will also affect the rate of tack development in the adhesive as well as the final tack strength of the adhesive. As such, in alternate embodiments of the present invention, the isocyanate is present in the adhesive in an amount from about 0.05 to about 30 weight percent, preferably from about 1.0 to about 15 weight percent, and most preferably about 4 weight percent, based upon the total weight of the adhesive.

In another embodiment of the present invention, an active hydrogen containing compound is included in the adhesive to react with and cure the isocyanate materials. Many common materials employed in acrylic achieves contain active hydrogen moieties in sufficient amounts to cure the tri-functional isocyanate and generate the desired tack strength. For example, methacrylic acid, phosphoric acid, HEMA-phosphate, and hydrophilic fumed silica are all reactive with the isocyanates of the present invention.

In a further embodiment of the present invention, additional materials, such as amines and other bases can function to catalyze the isocyanate reaction. In a preferred embodiment of the present invention, amine materials that are typically present in acrylic adhesive formulations such as TEDA (trietylenediamine) provide the additional benefit of catalyzing the isocyanate reaction to lead to a rapid development of tack. In a preferred embodiment of the present invention, these materials are balanced to provide tackiness to the adhesive in under 15 minutes, and preferably under 10 minutes, and most preferably under 5 minutes. The development of tack sufficient to "hold" the rubber is also driven by the weight of the rubber with heavier (thicker) rubbers requiring more time to develop tack, while "lighter" rubbers can be sufficiently mounted in under 5 minutes.

Addition of tri-functional isocyanate to the B-side provides an additional challenge if there is any active-hydrogen containing contaminants present in the B-side, including small amounts of water introduced from the atmosphere during manufacture or accompanying fillers such as titanium dioxide or the BPO source. One method to reduce moisture in the B-side is to dry the fillers and BPO source prior to manufacturing the adhesive. Additionally, any materials that contain active hydrogen, such as silica should be restricted to the A-side.

In another embodiment of the present invention a moisture scavenger is added to the B-side to ensure the tri-functional isocyanate remains largely unreacted until the time of application of the adhesive. In a preferred embodiment of the present invention, the moisture scavenger comprises a sulfonyl isocyanate, most preferably para-toluene-sulfonyl isocyanate. This material will preferentially react with any remaining water to prevent the water from reacting with the tri-functional isocyanate.

In a further embodiment of the present invention, the moisture scavengers optionally comprise diethylmalonate, alkylphenol alkylates, paratoluene sulfonic isocyanates, benzoyl chloride and orthoalkyl formates. Such stabilizers are preferably used in an amount of about 0.1 percent by weight or greater based on the total weight of the curable composition, preferably about 0.5 percent by weight and more preferably about 0.25 percent by weight, based on the weight of the adhesive.

In a further embodiment of the present invention, the adhesive comprises a primary acrylate monomer is provided comprising at least one free radical-polymerizable monomer in a major amount of the composition. Representative monomers include esters of (meth)acrylic acid such as methyl (meth)acrylate, ethyl (meth)acrylate, butyl (meth)acrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate (THFMA). The preferred monomer(s) contributes rigidity in the cured polymer and is selected from methacrylic esters exhibiting a homopolymer Tg of at least 50° C., preferably 60° C., and some as much as 105° C. In a preferred embodiment of the present invent, the (meth) acrylate monomer comprises at least 50 weight percent tetrahydrofurfuryl methacrylate and a minority amount of methylmethacrylate.

In an embodiment of the present invention, the primary acrylate monomer is present in the composition in an amount of between about 10 and about 90 weight percent, more preferably between about 30 and about 70 weight percent, and most preferably between about 40 and about 60 weight percent, based on the total weight of the composition.

In a further embodiment of the present invention additional monomers are incorporated to provide desired functional characteristics. In one embodiment of the present invention a reactive flexibilizing monomers is provided. The reactive flexibilizing monomer is reactive with the primary acrylate monomer and provides flexibility to the backbone of the resulting acrylic polymer. In one embodiment of the present invention, the reactive flexibilizing monomer comprises an acrylate comprising an olefinic group having at least 6 carbon atoms. This olefininc group provides the desired flexibility while the acrylate moiety allows for compatibility with the primary acrylate monomer. In one embodiment of the present invention, the reactive flexibilizing monomer can be represented by the formula H2C=CHCO2R, where R is a linear or branched hydrocarbon chain and the homopolymer has a Tg<0° C. In a preferred embodiment of the present invention, the reactive flexibilizing monomer comprises at least one of hexyl methacrylate, 2-ethylhexyl methacrylate, octyl methacrylate, or dodecyl (lauryl) methacrylate.

In an embodiment of the present invention, the reactive flexibilizing monomer is present in the composition in an amount of between about 0 and about 50 weight percent, more preferably between about 5 and about 25 weight percent, and most preferably between about 10 and about 15 weight percent, based on the total weight of the composition.

In a further embodiment of the present invention, a substrate dependent reactive monomer is provided. It is believed that an acrylate monomer that is substantially compatible with an elastomeric substrate aids in forming a robust bond with the substrate. For example, in an embodiment wherein the substrate comprises natural rubber, a substrate dependent reactive monomer comprising isobutylmethacrylate substantially improves bonding to the natural rubber. The substrate dependent reactive monomer is selected such that its Hildebrand solubility parameter is compatible with the Hildebrand solubility parameter of the elastomeric substrate. In particular, it is chosen in such a way that its solubility parameter does not differ by more than 10% from the Hildebrand solubility parameter of the elastomeric substrate.

The Hildebrand solubility parameter is well known and calculated by the square root of the cohesive energy density of the compound. The Hildebrand solubility parameter is directly related to the dispersion forces (Van der Waals forces) that are exerted between the molecules of a chemical substance. In particular, the Hildebrand solubility parameter is generally expressed in cal$^{1/2}$ cm.$^{-3/2}$.

Another method for determining compatibility is through a swell test. A selection of monomers is chosen to cover a wide range of Hildebrand solubility parameters. For each selected monomer, a rectangular piece of rubber of mass ~2 g is weighed and then submerged in monomer. The rubber is allowed to soak in the monomer for 24 hours with mass being measured beginning at 1 hour and then at regular intervals up to 24 hours. Those monomers which swell the rubber to the greatest extent on a per mole monomer basis are judged to be most compatible with the elastomeric substrate. These are then tested as candidates for the compatibilizing monomer within the adhesive formulation.

In an embodiment of the present invention, the substrate dependent reactive monomer is present in the composition in an amount of between about 0 and about 50 weight percent, more preferably between about 0 and about 25 weight percent, and most preferably between about 0 and about 10 weight percent, based on the total weight of the composition.

In one embodiment of the present invention, the adhesive composition further comprises a toughener. The toughener improves impact resistance of the cured adhesive and provides flexibility to reduce cohesive failure of the adhesive. The toughener examples include various solid and liquid elastomeric polymeric materials, and in particular liquid olefinic-terminated elastomers as described in U.S. Pat. Nos. 4,223,115; 4,452,944; 4,769,419; 5,641,834 and 5,710,235, the entire disclosure of each which is hereby incorporated by reference.

A-B-A or A-B-C triblock block copolymers are useful tougheners. In one example the A block is polystyrene, alpha-methyl styrene, t-butyl styrene, or other ring alkylated styrenes as well as mixtures of some or all of the above and the B block is an elastomeric segment having a Tg of 0° C. or less, such as that derived from a conjugated diene, isobutylene or other olefin, like ethylene-propylene monomer, and the C block, if present, is acrylonitrile.

In one embodiment of the present invention, a preferred toughener comprises a terblock polymer of styrene-butadiene-styrene with a polystyrene content of about 23% by weight. In another preferred embodiment of the present invention, a preferred toughener comprises styrene-butadiene-acrylonitrile.

In another embodiment of the present invention, other high molecular weight tougheners include, for example, block copolymers and random copolymers including but not limited to polyethylene, polypropylene, styrene-butadiene, polychloroprene, EPDM, chlorinated rubber, butyl rubber, styrene/butadiene/acrylonitrile rubber and chlorosulfonated polyethylene.

In another embodiment of the present invention an auxiliary toughener is provided. Preferred auxiliary tougheners comprise urethane modified olefinic-terminated liquid elastomers include those disclosed in U.S. Pat. No. 4,769,419 comprising the reaction product of an olefinic monoepoxide compound with a polycarboxylic homopolymer of conjugated dienes, and most specifically, the glycidyl methacrylate/carboxyl terminated butadiene (GMA/CTB) adduct as described in U.S. Pat. No. 4,769,419, Example 1.

In an embodiment of the present invention, the combined tougheners are present in the composition in an amount of between about 0 and about 50 weight percent, more preferably between about 10 and about 30 weight percent, and most preferably between about 20 and about 30 weight percent, based on the total weight of the composition.

In a further embodiment of the present invention, an adhesion promoter is provided to enhance the adhesion between the adhesive and metallic substrate. Adhesion promoters useful herein are the known phosphorus-containing compounds with mono-esters of phosphinic, mono- and diesters of phosphonic and phosphoric acids having one unit of vinyl or allylic unsaturation present. Vinylic unsaturation is preferred. Representative of the phoshorus-containing adhesion promoters are, without limitation, phosphoric acid; 2-methacryloyloxyethyl phosphate; bis-(2-methacryloyloxyethyl)phosphate; 2-acryloyloxyethyl phosphate; bis-(2-acryloyloxyethyl)phosphate; methyl-(2-methacryloyloxyethyl) phosphate; ethyl methacryloyloxyethyl phosphate; methyl acryloyloxyethyl phosphate; ethyl acryloyloxyethyl phosphate; propyl acryloyloxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate or haloethylhexyl acryloyloxyethyl phosphate; vinyl phosphonic acid; cyclohexene-3-phosphonic acid; (α-hydroxybutene-2 phosphonic acid; 1-hydroxy-1-phenylmethane-1,1-diphosphonic acid; 1-hydroxy-1-methyl-1-disphosphonic acid; 1-amino-1-phenyl-1,1-diphosphonic acid; 3-amino-3-hydroxypropane-1,1-disphosphonic acid; amino-tris (methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid. A preferred adhesion promoter: is 2-hydroxyethylmethacrylate phosphate (HEMA-phosphate).

Further adhesion promoters useful herein are the known alkenyl functional silanes, having an unsaturated organic moiety bonded to the silicone atom, for example an unsaturated acrylic, vinyl, allyl, methallyl, propenyl, hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl or styryl groups. Other alkenyl functional organometallics include titanates, such as vinylalkyl titanates, zirconates, zinc diacrylate, and zinc dimethacrylates.

Additionally carboxylic acids are good adhesion promoters, including methacrylic acid, itaconic acid, maleic acid, formic acid, mono-2-(methacryloyloxy)ethylsuccinate.

In an embodiment of the present invention, the adhesion promoter is present in the composition in an amount of between about 0 and about 20 weight percent, more preferably between about 0 and about 10 weight percent, and most preferably between about 0 and about 5 weight percent, based on the total weight of the composition.

In an additional embodiment of the present invention, a free-radical cure system is employed to cure the adhesive. A preferred system comprises known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive.

Substantially any of the known oxidizing and reducing agents which are so co-reactive can be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride.

Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine (DIIPT), dimethyl aniline, p-halogenated aniline derivatives and dimethyl-p-toluidine; and amineal-dehyde condensation products, for example, the condensation products of aliphatic aldehydes such as butyraldehyde with primary amines such as aniline or butylamine. The use of known accelerators and promoters with the redox couple catalyst systems can be advantageous.

In a further embodiment of the present invention, the acrylic adhesive composition comprises a co-accelerator. The co-accelerator will not cure the acrylic adhesive by itself but serves to increase the rate at which the redox system cures the adhesive. In a preferred embodiment of the present invention, the co-accelerator comprises a bicyclic diaza compound wherein the nitrogen atoms are present in the rings. In a most preferred embodiment of the present invention, the co-accelerator comprises 1,4-diazabicyclo[2.2.2]octane. In a further embodiment of the present invention, the co-accelerator comprises dimethylpiperazine. In an embodiment of the present invention, the co-accelerator is present in an amount from 0.10 to 3.0 weight percent based on the total weight of the composition.

Preferably, the oxidizing agent will be present in an amount in the range from about 1.0 to about 20, preferably about 5.0 to about 10 percent by weight of the adhesive composition, with the amount of reducing agent being in the range from about 0.1 to about 20, preferably about 1.0 to about 10 percent by weight of the adhesive composition. DIIPT is the most preferred reducing agent. The most preferred oxidizing agent is benzoyl peroxide.

In a further embodiment of the present invention, the adhesive comprises an epoxy compound. Epoxy compounds are thought to provide post-bake resistance and an acid-scavenging functionality to prevent acid formed in the cure reaction from reacting with the metallic substrate. The epoxy compound of embodiments of the present invention comprises any material that contains an epoxy (oxirane) group. Included epoxy resins are epoxy cresol novolacs, epoxy phenol novolacs and blends of either of these with bisphenol A epoxy resins. Monomeric epoxy compounds and epoxides of the polymeric type can be aliphatic, cycloaliphatic, aromatic or heterocyclic.

Epoxy resins based on bisphenol A, either solids, and capable of dissolution in a carrier, or liquid, are preferred as these are relatively inexpensive. There are a myriad of available epoxy materials, collectively referred to as epoxy resins whether resinous or simple compounds. In particular, simple epoxy compounds which are readily available include octadecylene oxide, glycidylmethacrylate, diglycidyl ether of bisphenol A.

In an embodiment of the present invention comprising an epoxy resin, the epoxy resin is present at no more than about 20 weight percent, based on the final weight of the adhesive formulation. In a preferred embodiment of the present invention, the epoxy resin is present in an amount of no more than about 15 weight percent, and in a most preferred embodiment of the present invention, the epoxy resin is present from about 2.5 to about 10 weight percent, based on the total weight of the adhesive formulation.

Other optional additives which are typically considered in fully formulated adhesives include antioxidants, inhibitors, anti-sag additives, thixotropes, processing aids, waxes, UV stabilizers, arc suppressants, pigments, scents, and drip suppressants. Examples of typical additives are silicas, fumed silica, zirconium silicate, alumina, hindered phenols, substituted hydroquinone, silane-treated talc, mica, feldspar, and wollastonite.

Although the adhesive of the present invention may take many forms, the most preferred adhesive systems are provided as multipack or two-part adhesive systems where one package or part contains the free radical-polymerizable monomer component and the reducing agent and a second part or package contains the oxidizing agent. Further, the trifunctional isocyanate and active hydrogen containing compounds are separated into each of the two parts. The two parts are mixed together at the time of use in order to initiate the reactive cure. After mixing the individual parts, one or both surfaces to be joined are coated with the mixed adhesive system and the surfaces are placed in contact with each other. Typical mixing ratios range from 1:1, to 4:1, to 10:1 by volume with the acrylic monomers and active hydrogen containing compounds typically in the "A" side and trifunctional isocyanates and oxidizing agents in the "B" side with other components balanced between the two.

In one embodiment of the present invention, the adhesive is provided in a two-part system with a first part comprising 30 to 60 weight percent of a primary acrylate monomer, 5 to 15 weight percent of a reactive flexibilizing monomer, 5 to 15 weight percent of a substrate dependent reactive monomer, 10 to 30 weight percent of a toughener, and 0.5 to 5 weight percent of a reducing agent, all based on the total weight of the first part. Similarly, the second part comprises 30 to 60 weight percent of a trifunctional isocyanate and 30 to 60 weight percent of an organic peroxide, all based on the weight of the second side. In a further preferred embodiment of the present invention, both sides optionally comprise fillers and additives.

The adhesives described in the embodiments of the present invention are useful in a number of elastomer to metal bonding applications. In a preferred embodiment of the present invention the adhesives are employed in a low-temperature bonding application of post-vulcanized rubber. "Low-temperature" refers to bonding without the application of external pressure or heat such as in an autoclave or through induction. In one embodiment of the present invention, this bonding operation takes place at a temperature of less than about 100° C. In a preferred embodiment of the present invention, the bonding process takes place at ambient conditions of less than about 70° C., and most preferably less than about 50° C. In another embodiment of the present invention, the adhesive cures at less than about 25° C. however the time to full cure is extended.

In one embodiment of the present invention, some elastomer formulations (commonly natural rubber) have additives such as free-radical inhibitors, waxes, and other compounds which can interfere with bonding. For these elastomers, a solvent wipe is often employed to remove any of these materials that have migrated to the surface of the rubber. Prior to bonding, a rag is moistened with applicable solvent (such as isopropyl alcohol, heptanes, etc) and used to wipe the elastomer surface several times to remove impurities. In another embodiment of the present invention, the rubber surface may optionally be buffed or lightly sanded to prepare for bonding. The bonding surface is then allowed to dry completely (5-10 minutes) before mating the pieces together.

In another embodiment of the present invention, the adhesive is deposited on at least one surface of a vulcanized elastomeric substrate or a second substrate, and then the elastomeric substrate is brought into contact with the second substrate such that the adhesive is disposed there between. The adhesive is then allowed to cure thereby bonding the vulcanized substrate to the second substrate. In a preferred embodiment of the present invention the second substrate comprises a metallic substrate, such as cold rolled steel, stainless steel, galvanized steel, or aluminum. In another preferred embodiment of the present invention, the elastomeric substrate comprises a rubber for use in tank lining applications.

EXAMPLES

In a first example, the following formulation was prepared to demonstrate the effectiveness of employing an acrylic-based adhesive to bond vulcanized elastomer at or near room temperature, along with a secondary isocyanate-cure mechanism to rapidly develop tack in the newly applied adhesive.

Example 1

Adhesive 1

| Functional Role | Constituent | Weight Percent |
|---|---|---|
| A-Side: | | |
| Acrylate Monomer(s) | MMA/THFMA | 44 |
| Additional Monomer(s) | 2-EHMA/Iso-BMA | 22 |
| Rubbery Toughener | Core/Shell and GMA/CTB | 23 |

Adhesive 1

| Functional Role | Constituent | Weight Percent |
|---|---|---|
| Reducing Agent | DIIPT | 0.5 |
| Additives* | various | 8.5 |
| B-Side: | | |
| Tri-functional isocyanurate | Desmodur N3300A | 45 |
| Initiator | 57% di-benzoyl peroxide in surfactant | 45 |
| Moisture Scavenger | Para-toluenesulfonyl isocyanate | 3 |
| Epoxy resin | Bisphenol-A Epoxy | 4 |
| Thickeners and pigments | $TiO_2$ | 3 |

*The active hydrogen containing compounds are present in the additives and include HEMA-phosphate, phosphoric acid, methacrylic acid, silica, and the like.

Additionally another adhesive formulation, designated Adhesive 1*, was prepared employing an identical B-side with an A-side that contains a very small amount of a commonly used additive in acrylic adhesives. The two formulations are essentially identical.

The above-formulations where evaluated using a "hang test" which was developed to determine the sufficiency of and time to develop tack. The substrates used were 1018 cold rolled steel, 80 grit blasted and used when "fresh", and the elastomer was a carbon black filled polychloroprene rubber, ¼ inch thick, buffed.

The procedure for the hang test is as follows:

Preparation

A 1 inch×5.5 inch (25.4 mm×139.7 mm), 4.2 gram rubber coupon is attached with a weight so that the total weight of the rubber and added weight is 36 grams.

Adhesive is dispensed and cast onto a 1 inch×2.5 inch (25.4 mm×63.5 mm) metal coupons. The adhesive is dispensed to a thickness of 30 mil (0.762 mm) in a 1 $in^2$ (6.45 $cm^2$) film that is 0.5 inches (12.7 mm) from the bottom of the coupon (the top of coupon has a hole). The coupons are then pinned vertically on an aluminum bar in the fume hood.

At the following time intervals (0, 5, 10, 15, 20, and 25 min), the rubber/weight assembly is mated to the adhesive surface, with slight pressure to ensure good contact.

The rubber/weight assembly is allowed to hang, and monitored to determine if the rubber/weight assembly falls or slides from the initial position.

Record the results of fall or sliding distance.

If there is no fall/slide, the adhesive is allowed to fully cure, and then tested using the standard 90 degree peel at 2 in/min (50.8 mm/min) according to ASTM-D429 Method D.

In the following tables, the results of the hang test are displayed as follows

F=sample fell/failed

Xmm=length of sample slide or S=Slid (but no measurement)

XX/YY %=bond strength (pli) and rubber retention (%) for a sample that did not fall or slide, or H=held (but no measurement)

| | RT PV Acrylic | | Adhesive 1 | |
|---|---|---|---|---|
| Time (min) | 1 | 2 | 1 | 2 |
| 0 | F | F | F | F |
| 5 | F | F | 7 mm | 11 mm |
| 10 | F | S | 2 mm | 2 mm |
| 15 | F | 7 mm | 83/75% | 78/80% |

-continued

|            | RT PV Acrylic | | Adhesive 1 | |
| --- | --- | --- | --- | --- |
| Time (min) | 1 | 2 | 1 | 2 |
| 20 | F | F | 77/80% | 66/80% |
| 25 | F | S | 65/80% | 77/75% |

|            | Adhesive 1* | | Adhesive 1 | |
| --- | --- | --- | --- | --- |
| Time (min) | 1 | 2 | 1 | 2 |
| 3 | Fell after 50 sec | slid, 3 mm | slid, 9 mm | slid, 15 mm |
| 6 | slid, 5 mm | H | H | H |
| 8 | (no data) | (no data) | H | (no data) |
| 10 | H | H | H | H |
| 15 | H | H | H | H |
| 20 | H | H | H | H |
| 25 | H | H | (no data) | (no data) |

The following table reflected bond peel adhesion (pli/rubber % tear):

|            | Adhesive 1* | | Adhesive 1 | |
| --- | --- | --- | --- | --- |
| Time (min) | 1 | 2 | 1 | 2 |
| 3 | — | 78.7/100 | 61.9/100 | 55.6/100 |
| 6 | 72.1/100 | 75.5/100 | 78.7/100 | 71.5/100 |
| 8 | (no data) | (no data) | 72.5/100 | (no data) |
| 10 | 70.2/100 | 69.2/100 | 63.3/100 | 69.8/100 |
| 15 | 65.7/100 | 66.0/100 | 49.6/100 | 64.9/100 |
| 20 | 63.8/100 | 59.4/100 | 55.3/100 | 61.3/100 |
| 25 | 62.8/100 | 66.3/100 | (no data) | (no data) |

|            | Adhesive 1 | | |
| --- | --- | --- | --- |
|  | 30 mils applied to metal | | 20 mils applied to both the rubber and metal |
| Time (min) | 1 | 2 | 1 |
| 2 | F | F | (no data) |
| 5 | F | F | F |
| 10 | S | S | S |
| 15 | H | H | H |
| 20 | H | H | H |
| 25 | H | H | (no data) |

Reposition Test:

A 15-minute specimen was mated, then repositioned and re-mated, showing no slippage. After 3 hour cure, this particular bond displayed 70 pli (12.3 N/mm) and about 70% rubber tear.

Adhesive Application on Both Rubber and Metal Sides:

In this test, the Adhesive 1 was applied to both rubber and metal at 20 mil (0.508 mm) thickness. After 15 minutes, these parts were mated and hung vertically without any slippage. There appears to be some variability between "success" at 10 minutes vs 15 minutes, however almost all samples held at 15 minutes.

12 Inch×12 Inch Panel Bonding:

On a vertical 12 inch×12 inch (30.5 cm×30.5 cm) cold rolled steel panel, the adhesive was applied in long beads and observed to show excellent sag resistance. The adhesive beads were spread with a 10 inch (25.4 cm) silicone spatula with serrated blade to a thickness of 30 mils (0.762 mm) After 15 minutes, a 12 inch×12 inch (30.5 cm×30.5 cm) rubber square was bonded to the metal panel. The two substrates were made good contact by stitching the rubber side using a rubber roller. The rubber patch was well attached to the steel panel without slippage.

Long Open Time Hang Test:

A hang test as described above was performed to demonstrate the ability to lengthen the open time of an adhesive of the present invention, while maintaining a rapid tack development. The A-side of Adhesive 2 differs from the A-side of Adhesive 1 recited above in that a reaction inhibitor to slow the reaction of acrylate/BPO was added.

| Time (min) | 60 min open time Adhesive 2 | 30 min open time Adhesive 1 |
| --- | --- | --- |
| 10 | 2 mm | 58/80% |
| 15 | 60/80% | 56/80% |
| 20 | 59/80% | 52/80% |
| 25 | 64/80% | 53/80% |
| 30 | 60/80% | 56/80% |
| 35 | 59/80% | 49/80% |
| 40 | 63/80% | 48/80% |
| 45 | 57/80% | 49/80% |
| 50 | 59/80% | 48/80% |
| 55 | 67/90% | 49/80% |
| 60 | 63/80% | 44/80% |

A peel strength of 50 pli (8.76 N/mm) and a rubber retention of greater than 50% were used as measures of success for the purposes of this test. As noted above, the 30 minute open time adhesive drops below 50 pli (8.76 N/mm) after 30 minutes, indicating success during the 30 minute open time, and failure after the 30 minute mark. The 60 minute adhesive demonstrates success throughout the 60 minute open time period. This illustrates the ability to tailor the formulations of the present invention to "dial in" a desired open time, yet still achieve tack within about 15 minutes and the desired bond strength of 50 pli (8.76 N/mm) or greater and greater than 50% rubber tear.

Example 2

In Example 2, three different tri-functional isocyanates were tested and all demonstrated acceptable development of tack. Samples were prepared as described above with adhesives containing each of the isocyanates noted below. The elastomeric substrate was a vulcanized natural rubber having a layer of vulcanized chlorobutyl rubber on the surface. The rigid substrate was a grit-blasted cold rolled steel.

|            | Isocyanate | | |
| --- | --- | --- | --- |
| Time (min) | HDI-Trimer | Asymmetric HDI-Trimer | IPDI-Trimer |
| 3 | fell | fell | fell |
| 6 | fell | fell | fell |
| 9 | 8 | 10 | 3 |
| 11 | 4 | 4 | — |

The alternate isocyanates showed tack development within an acceptable range of less than 20 minutes demonstrating the effectiveness of the various tri-functional cyclic isocyanates.

What is claimed is:

1. An adhesive system comprising two parts, an A-side comprising an acrylate monomer; a tertiary amine selected from the group consisting of diisopropanol-p-toluidine, dimethyl aniline, p-halogenated aniline derivatives, and dimethyl-p-toluidine; and 2-hydroxyethylmethacrylate phosphate (HEMA-phosphate); and a B-side comprising a trifunctional isocyanate and an oxidizer.

2. The adhesive system of claim 1, wherein the trifunctional isocyanate comprises an isocyanurate or an isocyanate comprising a biuret linkage.

3. The adhesive system of claim 2, wherein the trifunctional isocyanate comprises an isocyanurate trimer of hexamethylene diisocyanate.

4. The adhesive system of claim 1, wherein the trifunctional isocyanate is present in an amount from about 1.0 to about 7.0 weight percent based upon the total weight of the adhesive system.

5. The adhesive system of claim 1, wherein the acrylate monomer comprises at least one of tetrahydrofurfuryl methacrylate or methyl methacrylate.

6. The adhesive system of claim 1, wherein the acrylate monomer comprises at least 50 percent by weight of the adhesive system.

7. The adhesive system of claim 1, wherein the adhesive system further comprises a toughener.

8. The adhesive system of claim 1, wherein the adhesive system further comprises a moisture scavenger.

9. The adhesive system of claim 8, wherein the moisture scavenger comprises para-toluenesulfonyl isocyanate.

10. The adhesive system of claim 1, further comprising a moisture scavenger included in the B-side.

11. The adhesive system of claim 1, wherein the oxidizer comprises a peroxide.

12. The adhesive system of claim 1, wherein the A-side and the B-side are mixed together in order to initiate a reactive cure.

13. The adhesive system of claim 12, disposed between an elastomeric substrate and a second substrate.

14. The adhesive system of claim 7, wherein said toughener comprises an elastomeric polymeric material.

15. The adhesive system of claim 5, wherein the acrylate monomer further comprises a flexibilizing monomer selected from the group consisting of hexyl methacrylate, 2-ethylhexyl methacrylate, octyl methacrylate, and dodecyl methacrylate.

16. The adhesive system of claim 5, wherein the acrylate monomer further comprises isobutyl methacrylate.

17. The adhesive system of claim 1, further comprising an adhesion promoter comprising a mono or diester of a phosphonic or phosphoric acid having one unit of vinyl or allylic unsaturation.

* * * * *